United States Patent [19]
Kurogane et al.

[11] Patent Number: 5,830,776
[45] Date of Patent: Nov. 3, 1998

[54] METHOD OF MANUFACTURING THIN FILM TRANSISTOR

[75] Inventors: Saori Kurogane, Higashiosaka; Hiromi Sakamoto, Kashiba, both of Japan

[73] Assignee: Sharp Kabushiki Kaisha, Osaka, Japan

[21] Appl. No.: 685,925

[22] Filed: Jul. 22, 1996

[30] Foreign Application Priority Data

Aug. 4, 1995 [JP] Japan ..................................... 7-199538

[51] Int. Cl.[6] .................................................. H01L 21/84
[52] U.S. Cl. ............................ 438/30; 438/151; 438/585
[58] Field of Search ............................... 438/30, 151, 585

[56] References Cited

U.S. PATENT DOCUMENTS

| | | | |
|---|---|---|---|
| 4,960,719 | 10/1990 | Tanaka et al. | 438/30 |
| 5,032,531 | 7/1991 | Tsutsui et al. | 438/30 |
| 5,585,290 | 12/1996 | Yamamoto et al. | 438/30 |
| 5,605,847 | 2/1997 | Zhang | 438/30 |
| 5,614,427 | 3/1997 | Den Boer et al. | 438/30 |
| 5,633,182 | 5/1997 | Miyawaki et al. | 438/30 |

FOREIGN PATENT DOCUMENTS 6-338612  12/1994  Japan .

*Primary Examiner*—John Niebling
*Assistant Examiner*—Richard A. Booth
*Attorney, Agent, or Firm*—Birch, Stewart, Kolasch & Birch, LLP

[57] ABSTRACT

A terminal section for anodic oxidation made of a metal which is the same kind of a metal as a light shielding film is formed on an end of a light transmitting substrate. Then, wiring space for the terminal section for anodic oxidation is masked, and a first insulating film, a semiconductor layer and a second insulating film are deposited by the sputtering method or the CVD method, for example. Moreover, an electrically conductive material to be a gate electrode is laminated and patterned on the second insulating film and the terminal section for anodic oxidation so that the wiring space for the terminal section for anodic oxidation is exposed. As a result, the gate electrode which is electrically connected to the terminal section for anodic oxidation is formed. By making wiring in the wiring space for the terminal section for anodic oxidation, the gate electrode is anodically oxidized. With the above method, only the wiring space for the terminal section for anodic oxidation is easily exposed, and the terminal section for anodic oxidation can be electrically connected to the gate electrode. Therefore, with the above method, a number of the processes can be decreased, the process for anodic oxidation can be simplified and cost of production can be reduced. Moreover, a thin film transistor with high reliability can be provided.

11 Claims, 14 Drawing Sheets

SOAK IN ELECTROLYTE ic tion as a terminal section 30 for anodic oxidization so that electric connection to the gate electrode 6 is obtained, and the gate electrode 6 is anodically oxidized. As a result, side anodic oxide films 8 as a first anodic oxide film are formed only on both the side surfaces of the gate electrode 6. In other words, since the resist 7 is laminated on the upper surface of the gate electrode 6, the upper surface of the gate electrode 6 is not anodically oxidized, and only the side surface of the gate electrode 6 is anodically oxidized.

METHOD OF MANUFACTURING THIN FILM TRANSISTOR

FIELD OF THE INVENTION

The present invention relates to a method of manufacturing a thin film transistor which is used as a switching element for selecting a picture element and a driver element for driving liquid crystal in a liquid crystal display device.

BACKGROUND OF THE INVENTION

Conventionally, a lot of trap levels partially exist in a semiconductor thin film of a thin film device, such as a thin film-type insulated gate field effect transistor. For this reason, fairly much OFF-state current flows through such trap levels, and thus a data retaining characteristic is deteriorated. Therefore, it is a pressing need to suppress the OFF-state current low.

In order to suppress the OFF-state current low, it is required to increase a ratio of an ON-state current to an OFF-state current in the thin film transistor and to realize a higher withstand voltage.

Therefore, in order to achieve the above object, conventionally, a so-called offset region is provided in a channel region end which separates a source region from a drain region both of which are formed on a semiconductor layer of a thin film transistor. Here, the offset region is a region, which excludes impurities, for maintaining a prescribed interval so that a gate electrode is not overlapped on the source/drain regions. In the above method, concentration of an electric field on a PN junction formed between the source region and the drain region is relieved, and the OFF-state current is lowered.

As one example of the method of forming an offset region, Japanese Unexamined Patent Publication No. 6-338612/1994 (Tokukaihei 6-338612) discloses a method of forming an anodic oxide film on an upper surface and a side surface of a gate electrode through an anodically oxidizing method and of implanting ions into a semiconductor layer using the anodic oxide film as a mask.

The following describes a process of manufacturing a thin film transistor in the case where an offset region is formed by the above-mentioned conventional method on reference to FIGS. 20 through 29.

First, as shown in FIG. 20, a light shielding film 2 is deposited on a light transmitting substrate 1 made of glass, etc. by using a metal or metallic silicide. Then, an insulating film 3 as a first insulating film is deposited so as to cover the light transmitting substrate 1 and the light shielding film 2. Thereafter, a semiconductor layer 4 is formed one-size smaller than the light shielding film 2 so as to be superimposed on the pattern of the light shielding film 2. Then, as shown in FIG. 21, a gate insulating film 5 as a second insulating film is deposited so as to cover the semiconductor layer 4 and the insulating film 3.

Next, as shown in FIG. 22, Al or Al alloy to be a gate electrode 6 is deposited on the gate insulating film 5. Thereafter, as shown in FIG. 23, a resist 7 is laminated, and the gate electrode 6 is patterned by the photolithography method or the etching method. Next, the resist 7 which remains on the gate electrode 6 on one end of the light transmitting substrate 1 is peeled off so that an upper surface of the gate electrode 6 on the one end of the light transmitting substrate 1 is exposed.

Thereafter, as shown in FIG. 24, wiring for anodic oxidization is connected to the above-mentioned exposed por- Next, as shown in FIG. 25, after the resist 7 is completely peeled off, the anodic oxidation is again carried out in order to improve heat resistance of the Al as the gate electrode 6. At this time, not only the upper surface but also both the side surfaces of the gate electrode 6 is anodically oxidized, and an anodic oxide film 9 as a second anodic oxide film is formed. Thereafter, an impurity ion is doped by using the gate electrode 6, the side anodic oxide films 8 and the anodic oxide film 9 as a mask, and thus an impurity region 10 is formed on the end of the semiconductor layer 4.

Next, as shown in FIG. 26, the side anodic oxide films 8 are etched, and a laser beam is projected thereto from the upper side of the gate electrode 6. As a result, the impurity region 10 is activated so that source/drain regions are formed, and simultaneously an offset region 11 is formed.

As shown in FIG. 27, a layer insulating film 12 as a third insulating film is deposited on the gate insulating film 5 and the anodic oxide film 9. Then, as shown in FIG. 28, the layer insulating film 12 and the gate insulating film 5 are etched so that a contact hole which is connected to the source/drain regions is formed. The contact hole is coated with a metal and patterning is carried out thereon. As a result, source/drain electrodes 13 and wiring, not shown, which is electrically connected to the source/drain electrodes 13 are formed. Thereafter, as shown in FIG. 29, a passivation film 14 is deposited thereon so that a thin film transistor 31 is completed.

However, in the case where the anodic oxidation is carried out on the surface of the gate electrode 6 by using the conventional method, in order to electrically connect the wiring for anodic oxidation to the gate electrode 6, it is necessary to expose the gate electrode 6 on the one side of the light transmitting substrate 1 as the terminal section 30 for anodic oxidation.

Examples of the method of exposing the gate electrode 6 are (i) a method of removing the resist 7 by soaking the end of the light transmitting substrate (hereinafter, referred to as substrate) 1 on which the gate electrode 6 has been formed, into a resist peeling solution or an organic solvent such as acetone, and (ii) a method of patterning the gate electrode 6 and applying an electrically conductive material such as silver paste to the portion to be the terminal section 30 for anodic oxidation so that the portion is electrically connected to the gate electrode 6.

However, the method (i) has an disadvantage of difficulty in controlling the soaking position of the substrate with respect to the surface of the peeling solution such as a resist peeling solution or an organic solvent. Furthermore, it is necessary to peel off the resist 7 which is the portion to be the terminal section 30 for anodic oxidation, thereby increasing the processes and requiring a troublesome task. Moreover, there arises a problem that waste disposal should be carried out.

The method (ii) possibly causes a fault in the transistor. Namely, during the process of peeling off the resist 7 after forming the side anodic oxide films 8, not only the resist 7 but also the electrically conductive material is peeled off, and the electrically conductive material remained in the peeling solution adheres to the substrate. Furthermore, in the method (ii) after the resist 7 is peeled off, when the anodic oxide film 9 is formed, there arises problems of unsatisfactory electrical connection between the wiring for anodic oxidation and the gate electrode 6, and of another application of an electrically conductive material.

SUMMARY OF THE INVENTION

It is an object of the present invention to provide a method of manufacturing a thin film transistor which is capable of simplifying a process for anodic oxidation and obtaining a thin film transistor having high reliability.

In order to achieve the above object, the method of manufacturing a thin film transistor of the present invention includes:

the first step of forming a light shielding film and a terminal section for anodic oxidation on an insulating light transmitting substrate;

the second step of laminating a first insulating film, a semiconductor layer and a second insulating film on the light shielding film in this order;

the third step of forming a gate electrode on the second insulating film so that the gate electrode is electrically connected to the terminal section for anodic oxidation; and the fourth step of forming an anodic oxide film on the surface of the gate electrode.

In accordance with the above arrangement, when the terminal section for anodic oxidation is previously formed, after forming the gate electrode, it is not necessary to expose the upper surface of the gate electrode on one end of the light transmitting substrate in order to use the upper surface as the terminal section for anodic oxidation. Therefore, it is not required to, for example, control a soaking position of the substrate with respect to the surface of a peeling solution for peeling only the resist on one end of the light transmitting substrate from the gate electrode. Moreover, after forming the gate electrode, a new step of electrically connecting the gate electrode to the wiring for anodic oxidation is not also required. For this reason, with the method, the anodically oxidizing process can be simplified, and cost of production can be reduced. Further, the thin film transistor with high reliability can be provided.

In addition, it is preferable that the third step includes:

the step of laminating an electrically conductive material on the second insulating film and the terminal section for anodic oxidation so that the wiring space for the terminal section for anodic oxidation is exposed; and the step of forming a gate electrode, which is electrically connected to the terminal section for anodic oxidation, on the second insulating film by patterning the electrically conductive material using a resist.

In accordance with the above method, the gate electrode which is electrically connected to the terminal section for anodic oxidation can be easily formed on the second insulating film without requiring a special method, unit, etc.

In addition, it is desirable that the light shielding film and the terminal section for anodic oxidation are made of the same kind of a metal. In this case, for example, after the metal to be the light shielding film is laminated on the light transmitting substrate of the thin film transistor, the light shielding film and the terminal section for anodic oxidation are patterned. As a result, the film-like terminal section for anodic oxidation as well as the light shielding film can be formed at the same time.

In addition, in the present invention, it is desirable that the wiring space for the terminal section for anodic oxidation is masked when the second and third steps are performed.

In accordance with the above arrangement, the first insulating film, the semiconductor layer, the second insulating film and the gate electrode can be easily formed without the adhesion of an excessive material to the wiring space.

For fuller understanding of the nature and advantages of the invention, reference should be made to the ensuing detailed description taken in conjunction with the accompanying drawings.

BRIEF DESCRIPTION OF THE DRAWINGS

FIG. 3(*a*) is the explanatory drawing viewed from the back side of the light transmitting substrate, on which the first insulating film has been formed, placed on a substrate holder; FIG. 3(*b*) is the explanatory drawing viewed from the front side of the light transmitting substrate, on which the first insulating film has been formed, placed on the substrate holder; and FIG. 3(*c*) is the explanatory drawing which shows that the first insulating film is formed on the light transmitting substrate placed on the substrate holder by using the sputtering method.

DETAILED DESCRIPTION OF THE PREFERRED EMBODIMENTS

Figure 1:
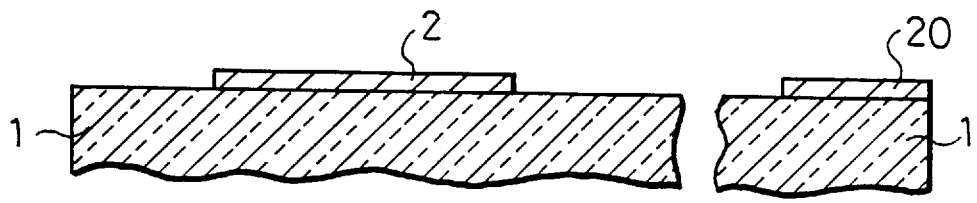
FIG. 1 is a cross sectional view which shows a step of manufacturing a thin film transistor of the present invention, more specifically, the step of process of forming a light shielding film and a terminal section for anodic oxidation on a light transmitting substrate using the same kind of a metal.

The following describes one embodiment of the present invention on reference to FIGS. 1 through 19. Here, those members that have the same arrangement and functions, and that are described in the conventional example are indicated by the same reference numerals and the description thereof is omitted.

FIGS. 1 through 19 are cross sectional views which show a method of manufacturing a thin film transistor which is used as a switching element in a portion for one pixel in a liquid crystal display panel. Here, the description refers to the method in the case where a so-called top gate type transistor, which is arranged so that its gate electrode is formed on the opposite side to the substrate with respect to the semiconductor layer, is used as a thin film transistor.

First, as shown in FIG. 1, Ta of 150 nm is deposited on an electrical insulating light transmitting substrate 1 made of glass, etc. Then, the deposited Ta is patterned in an island shape so that a light shielding film 2 is formed, and a terminal section 20 for anodic oxidation is simultaneously formed on the end of the light transmitting substrate 1. As a result, the terminal section 20 for anodic oxidation as well as the light shielding film 2 can be simultaneously formed by using Ta which is the same kind of a metal as in the light shielding film 2. Wiring for anodic oxidation is formed on a wiring space 19 provided on the end of the terminal section 20 for anodic oxidation and the wiring is electrically connected to the gate electrode 6 so that the terminal section 20 for anodic oxidation is used as a terminal for anodically oxidizing the surface of the gate electrode 6 in the later process.

Figure 2:
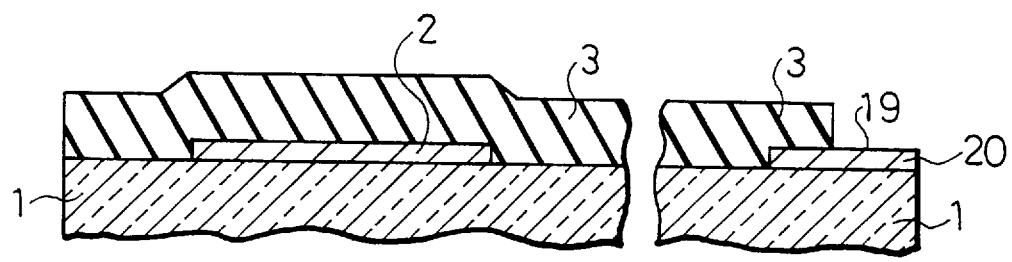
FIG. 2 is a cross sectional view which shows a next step of manufacturing a thin film transistor following the step shown in FIG. 1, namely, the step of forming a first insulating film on the light transmitting substrate so that the first insulating film covers the light shielding film and a portion of the terminal section for anodic oxidation other than a wiring space.
Figure 3:
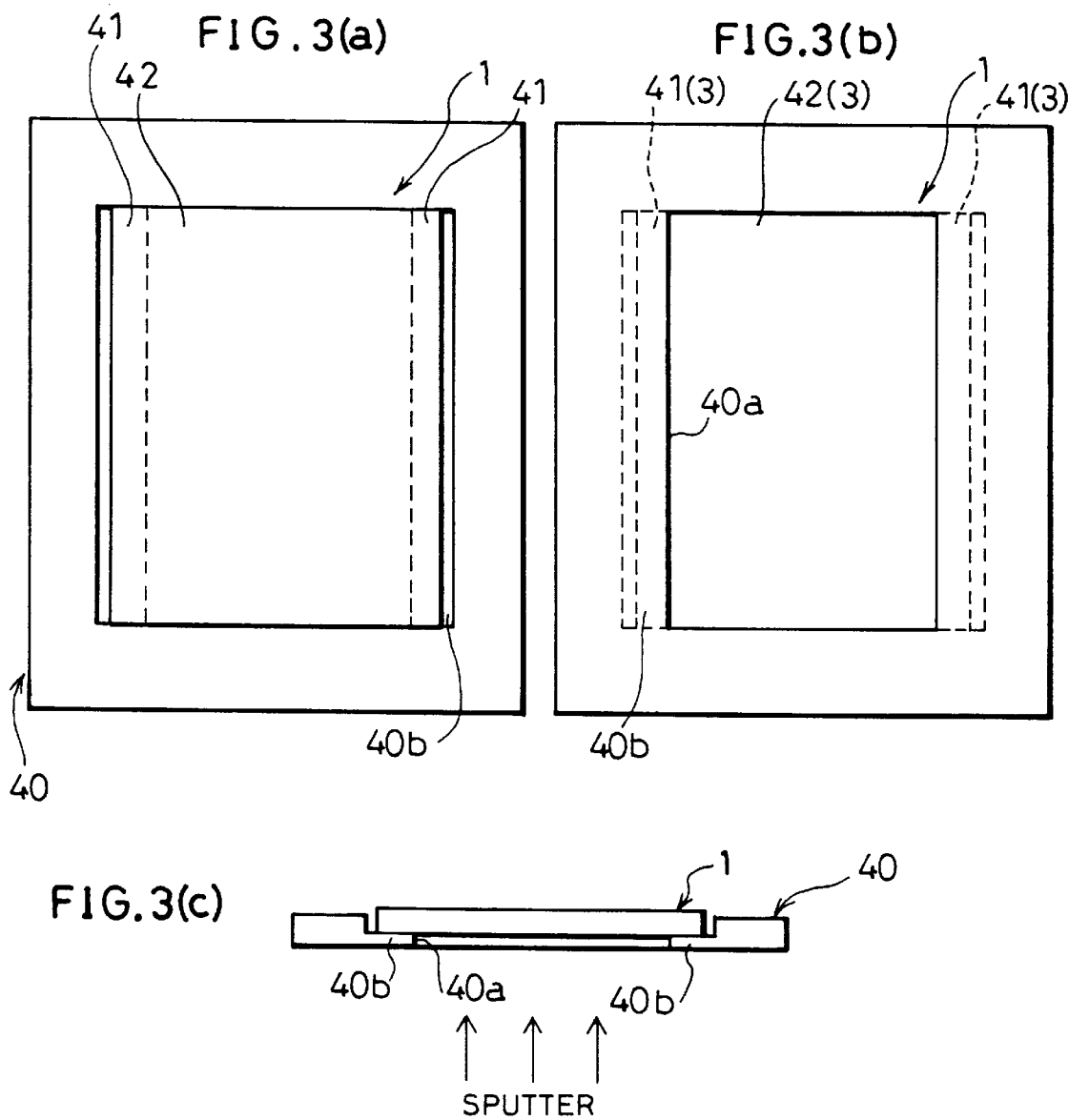
FIGS. 3(*a*) through 3(*c*) are explanatory drawings which show one example of the method of forming the first insulating film shown in FIG. 2.

Next, as shown in FIG. 2, $SiO_2$ of 300 nm is deposited on the light transmitting substrate 1 so as to cover the light shielding film 2 and a portion of the terminal section 20 for anodic oxidation other than the wiring space 19, and an insulating film 3 as a first insulating film is formed.

As examples of a method of forming the insulating film 3 so that $SiO_2$ does not adhere to the wiring space 19 is as follows. As shown in FIG. 3(c), the light transmitting substrate 1 on which the light shielding film 2 and the terminal section 20 for anodic oxidation have been formed is placed on protruding portions 40b provided on both the edges of an opening 40a of a substrate holder (tray) 40 with its face, on which the light shielding film 2 is formed (front face of the substrate), facing downward so that the light transmitting substrate 1 is held. Next, $SiO_2$ is deposited on the light transmitting substrate 1 which is in the substrate holder 40 by sputtering $SiO_2$ from the underside of the substrate holder 40, namely, the front face of the substrate. When $SiO_2$ is deposited by this method, the protruding portions 40b of the substrate holder 40 functions as a mask, and thus as shown in FIGS. 3(a) and 3(b), a non-sputtered region 41 and a sputtered region 42 are produced. As a result, the insulating film 3 made of $SiO_2$ is formed on the sputtered region 42. Meanwhile, the non-sputtered region 41 is used as the wiring space 19. FIG. 3(a) is a drawing of the light transmitting substrate 1 in the substrate holder 40 on which the insulating film 3 has been formed viewed from the back side of the light transmitting substrate 1, and FIG. 3(b) is a drawing of the light transmitting substrate 1 in the substrate holder 40 on which the insulating film 3 has been formed viewed from the front side of the light transmitting substrate 1.

Figure 4:
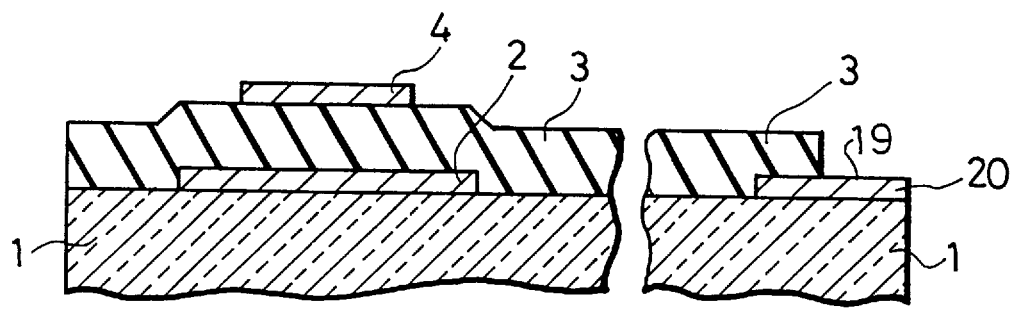
FIG. 4 is a cross sectional view which shows a next step of manufacturing a thin film transistor following the step shown in FIG. 2, namely, the step of forming a semiconductor layer on the first insulating film.

Next, as shown in FIG. 4, a silicon layer is deposited on the insulating film 3 so that its thickness becomes 50 nm and it is patterned. Then, an island-like semiconductor layer 4 is formed so as to be superimposed on the pattern of the light shielding film 2.

Figure 5:
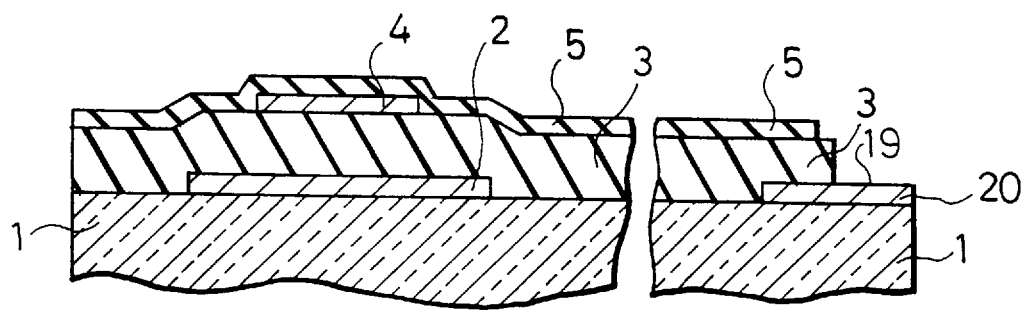
FIG. 5 is a cross sectional view which shows a next step of manufacturing a thin film transistor following the step shown in FIG. 4, namely, the step of forming a second insulating film on the semiconductor layer and the first insulating film.

As shown in FIG. 5, $SiO_2$ is deposited on the insulating film 3 so as to cover the semiconductor layer 4, and a gate insulating film 5 as a second insulating film is formed.

Figure 6:
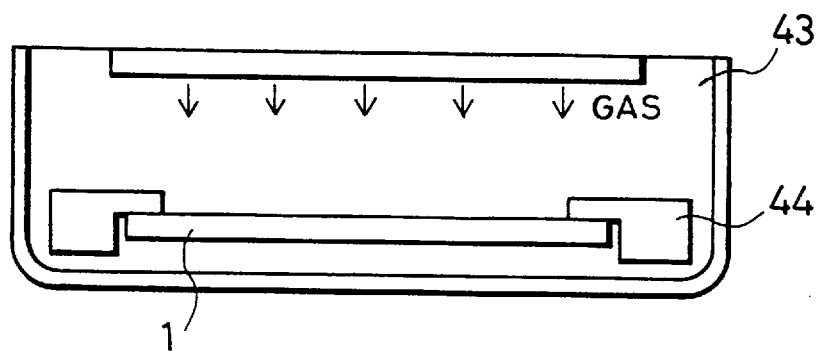
FIG. 6 is an explanatory drawing which shows one example of a method of forming the second insulating film shown in FIG. 5, more specifically, the method of forming the second insulating film by the CVD method with the wiring space of the terminal section for anodic oxidation being masked.

The following describes a method of forming the gate insulating film 5 so that $SiO_2$ does not adhere to the wiring space 19, namely, CVD (chemical vapor deposition) method. In this case, as shown in FIG. 6, a circumference of the light transmitting substrate 1, which is an area where the wiring space 19 is formed, is completely covered by pressing it down by a clamp ring 44. Then, the light transmitting substrate 1 is set in a reaction chamber 43 of a CVD unit, and a material gas is sent thereto from the side where the semiconductor layer 4 has been formed. In accordance with this method, since the clamp ring 44 functions as a mask, the gate insulating film 5 can be formed so that $SiO_2$ does not adhere to the wiring space 19.

Figure 7:
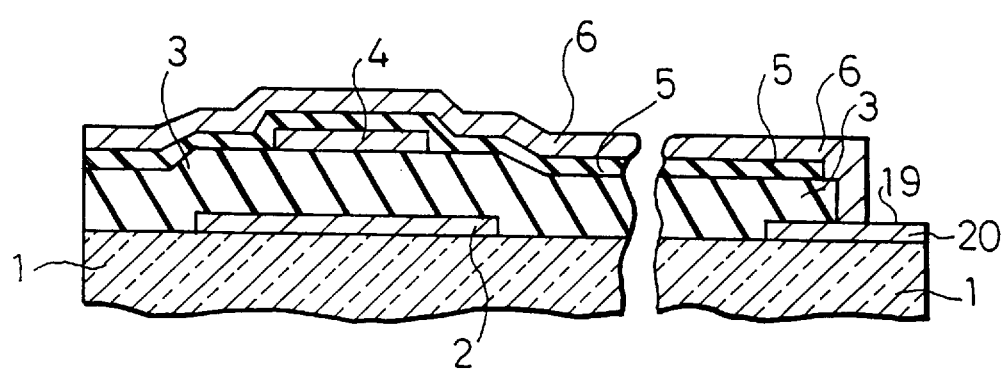
FIG. 7 is a cross sectional view which shows a next step of manufacturing a thin film transistor following the step of FIG. 5, namely, the step of laminating an electrically conductive material for forming a gate electrode on the second insulating film.

Next, a gate electrode 6 is formed on the gate insulating film 5 so as to be electrically connected to the terminal section 20 for anodic oxidation. The following describes a method of forming the gate electrode 6. First, as shown in FIG. 7, an electrically conductive material (gate metal) to be the gate electrode 6 is deposited on the gate insulating film 5 and the terminal section 20 for anodic oxidation so that the wiring space 19 is exposed. More concretely, Al—Ti (1.0 wt %) (namely, Al alloy containing Ti at the rate of 1 weight %) which can be anodically oxidized as the gate metal is used so as to be deposited by the sputtering method with a thickness of 350 nm. When the above process is performed, it is preferable that the wiring space 19 is masked so that the gate metal does not adhere to the wiring space 19 (wiring portion).

Figure 8:
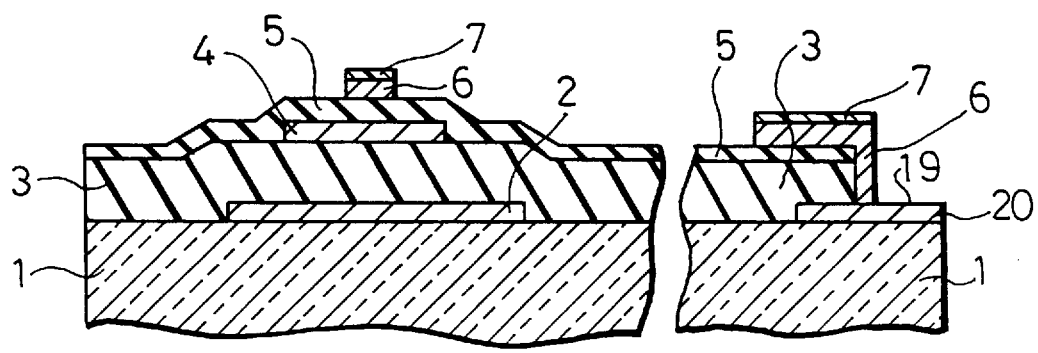
FIG. 8 is a cross sectional view which shows a next step of manufacturing a thin film transistor following the step of FIG. 7, namely, the step of patterning the gate electrode on the second insulating film.

As shown in FIG. 8, a resist 7 is formed on the gate metal and patterned so that the gate electrode 6 is formed. When the above method is used, the gate electrode 6, which is electrically connected to the terminal section 20 for anodic oxidation can be easily formed on the gate insulating film 5 without requiring a special method, unit, etc., and the resist which was used in forming the gate electrode 6 can be directly used in the later anodically oxidizing process.

Figure 9:
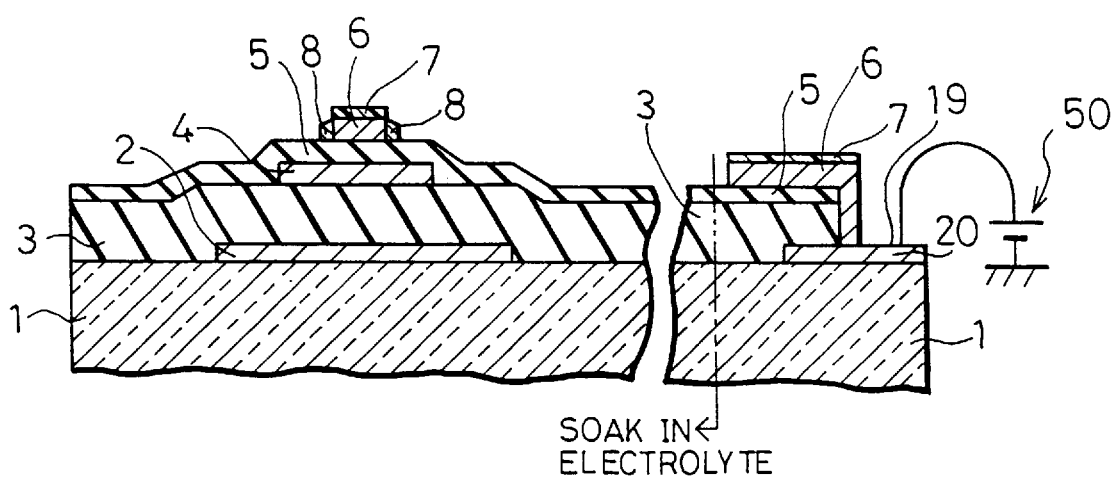
FIG. 9 is a cross sectional view which shows a next step of manufacturing a thin film transistor following the step of FIG. 8, namely, the step of forming a side anodic oxide film on the side of the gate electrode.

Then, as shown in FIG. 9, after the wiring space 19 is connected to a power source 50, the light transmitting substrate 1 on which the gate electrode 6 has been formed is soaked in electrolyte so that a contact portion of the gate electrode 6 with the electrolyte is anodically oxidized. The following details the anodically oxidizing process (first anodically oxidizing process).

Figure 10:
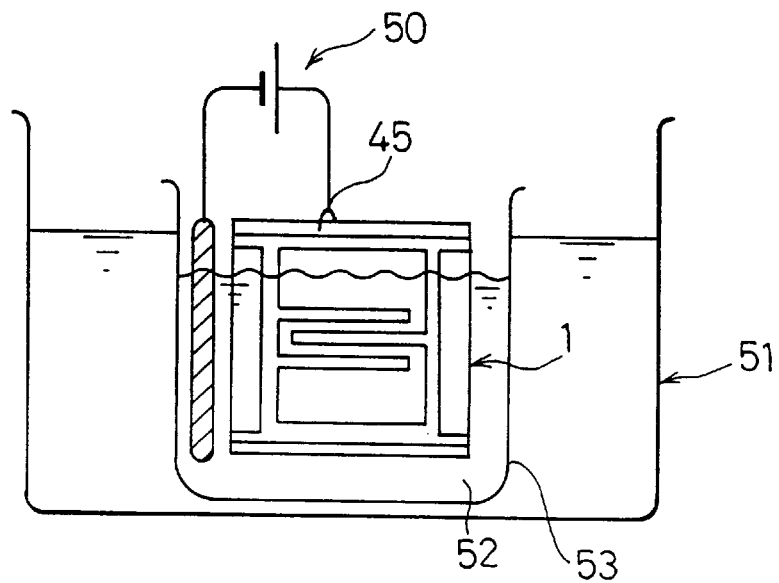
FIG. 10 is an explanatory drawing which shows an anodically oxidizing step of forming the side anodic oxide films shown in FIG. 9.
Figure 11:
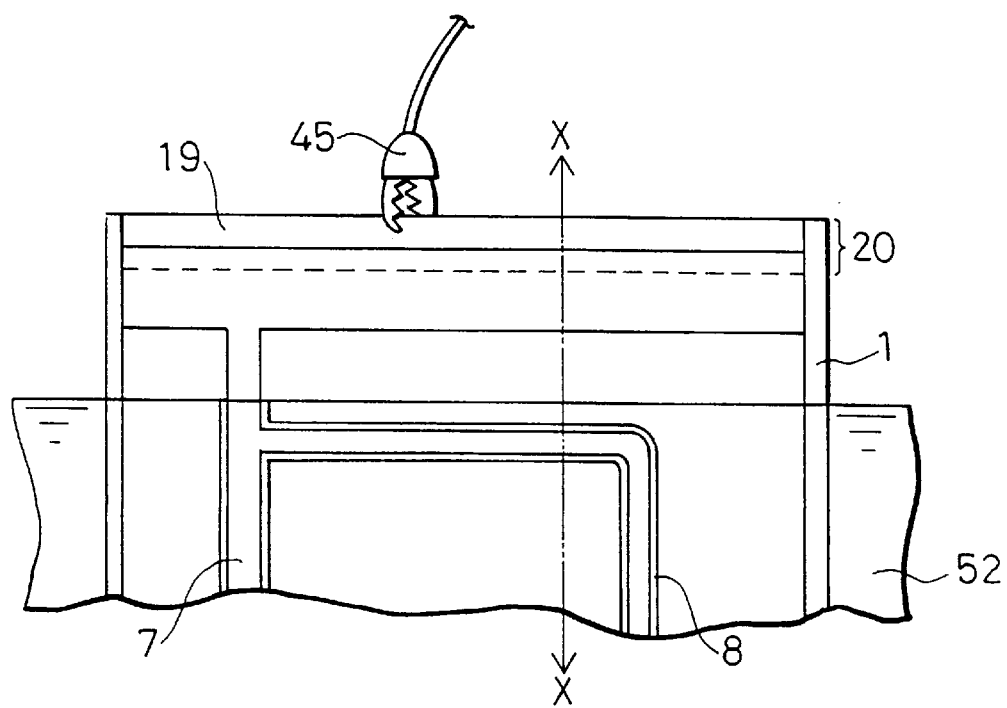
FIG. 11 is an enlarged drawing of the main section of FIG. 10.

First, as shown in FIGS. 10 and 11, the exposed portion of the wiring space 19 on the terminal section 20 for anodic oxidation is fastened by a metal grip 45 so as to be connected to the power source 50. At this time, the resist 7 which is used in patterning the gate electrode 6 is not peeled off, and it is used as a protective film for anodic oxidation. The light transmitting substrate 1 is held with the terminal section 20 for anodic oxidation facing upward, and as shown in FIG. 10, it is soaked in a container 53 into which electrolyte 52 composed of a 3% oxalic acid aqueous solution is poured. Here, the electrolyte 52 has been previously maintained at constant temperature in a thermostatic oven 51. Thereafter, a voltage of 8V and a current of 0.125 $mA/cm^2$ are applied from the power source 50 to the light transmitting substrate 1. As a result, as shown in FIG. 11, side anodic oxide films 8 as the first anodic oxide film are formed on both the sides of the gate electrode 6 on the contact portion with the electrolyte 52, namely, only on a portion which is not covered with the resist 7. In this case, since the resist 7 is laminated on the upper surface of the gate electrode 6, the upper surface of the gate electrode 6 is not anodically oxidized, and only both the sides of the gate electrode 6 is anodically oxidized. Here, FIG. 9 corresponds to the cross sectional view taken substantially on the line X—X of FIG. 11.

Figure 12:
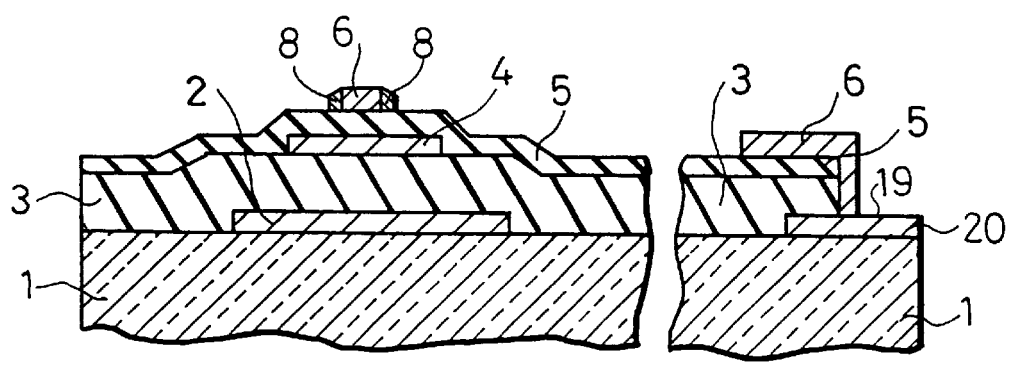
FIG. 12 is a cross sectional view which shows a next step of manufacturing a thin film transistor following the step of FIG. 9, namely, the step of peeling off a resist from the gate electrode.
Figure 13:
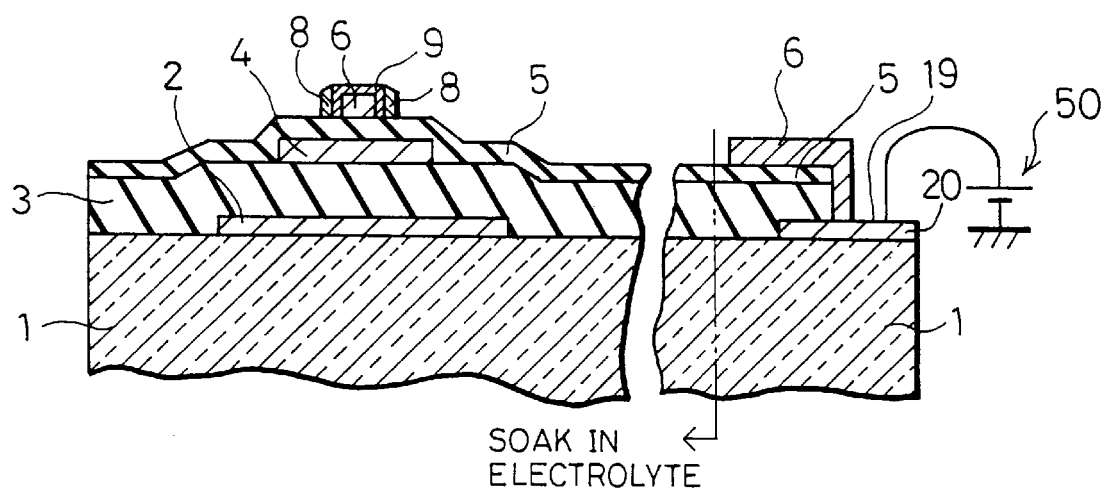
FIG. 13 is a cross sectional view which shows a next step of manufacturing a thin film transistor following the step of FIG. 12, namely, the step of forming an anodic oxide film on the upper portion and the side of the gate electrode.
Figure 14:
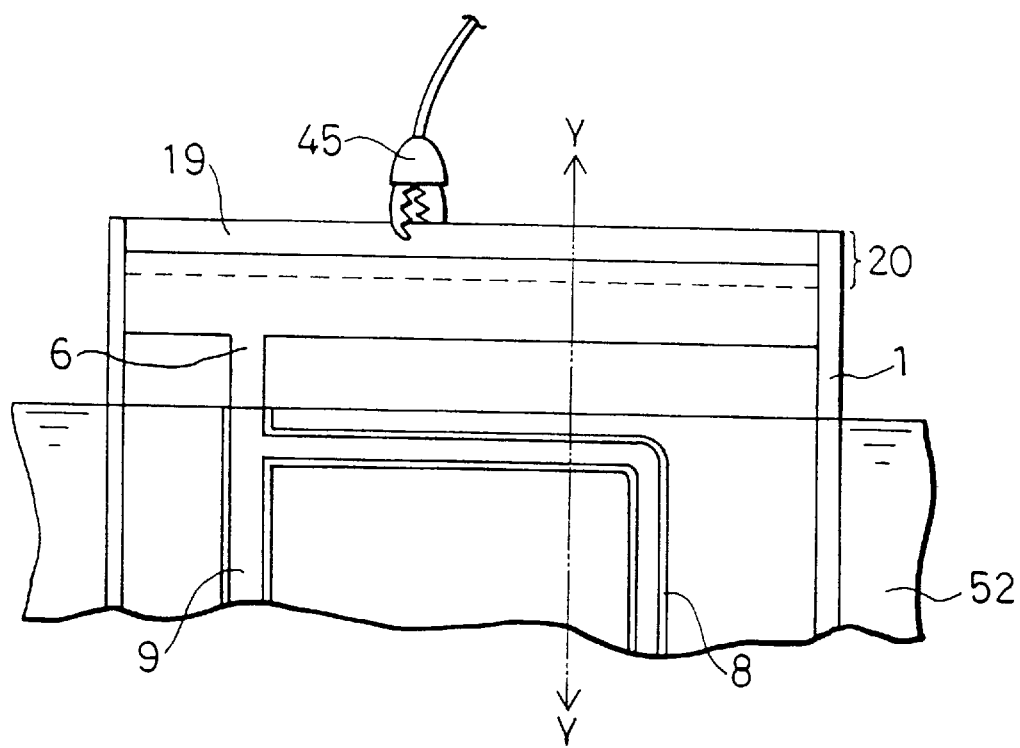
FIG. 14 is an explanatory drawing which shows an anodically oxidizing step of forming the anodic oxide film shown in FIG. 13.

As shown in FIG. 12, the resist 7 is peeled off so that the upper surface of the gate electrode 6 is exposed, and the gate electrode 6 is again anodically oxidized (second anodically oxidizing process) in order to improve its heat resistance. The method of anodic oxidation is basically same as that shown in FIG. 10. First, as shown in FIG. 14, the wiring space 19 which is the exposed portion on the terminal section 20 for anodic oxidation is fastened by the metal grip 45 so as to be connected to the power source 50. Then, the light transmitting substrate 1 is soaked in the electrolyte 52 composed of a solution in which a ratio of 3% ammonium tartrate to ethylene glycol is 1:9. Thereafter, a voltage of 80 V and a current of 0.5 $mA/cm^2$ are applied from the power source 50 to the light transmitting substrate 1, and the light transmitting substrate 1 is anodically oxidized. In this anodically oxidizing process, as shown in FIGS. 13 and 14, since the resist 7 is removed, the upper surface of the gate electrode 6 on the contact portion with the electrolyte 52 is anodically oxidized. Moreover, in the second anodically oxidizing process, not only the upper surface of the gate electrode 6 but also both the sides of the gate electrode 6 is anodically oxidized, and an anodic oxide film (second anodic oxide film) 9 having excellent heat resistance is formed on the upper surface and the side of the gate electrode 6. Here, FIG. 13 corresponds to the cross sectional view taken substantially on the line Y—Y of FIG. 14.

Figure 15:
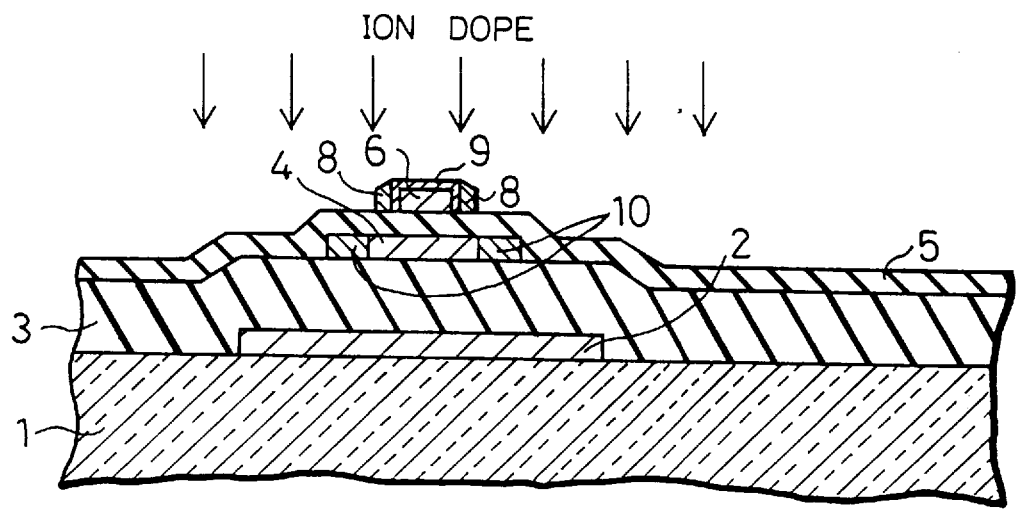
FIG. 15 is a cross sectional view which shows a next step of manufacturing a thin film transistor following the step in FIG. 13, namely, the step of forming an impurity layer on the semiconductor layer by ion doping.

As shown in FIG. 15, impurity ions are implanted (ion dope) by using the gate electrode 6, the side anodic oxide films 8 and the anodic oxide film 9 as masks. More specifically, phosphine ($PH_3$) and hydrogen ($H_2$) are used as doping gases, and under the conditions in which an acceleration voltage is 80 keV and dose is $5 \times 10^{14}/cm^2$, $n^+$ ions are implanted. Then, boron fluoride ($B_2F_6$) and hydrogen ($H_2$) are used as doping gases, and under the conditions that an acceleration voltage is 65 keV and dose is $9 \times 10^{15}/cm^2$, $p^+$ ions are implanted. As a result, an impurity region 10 is formed.

Figure 16:
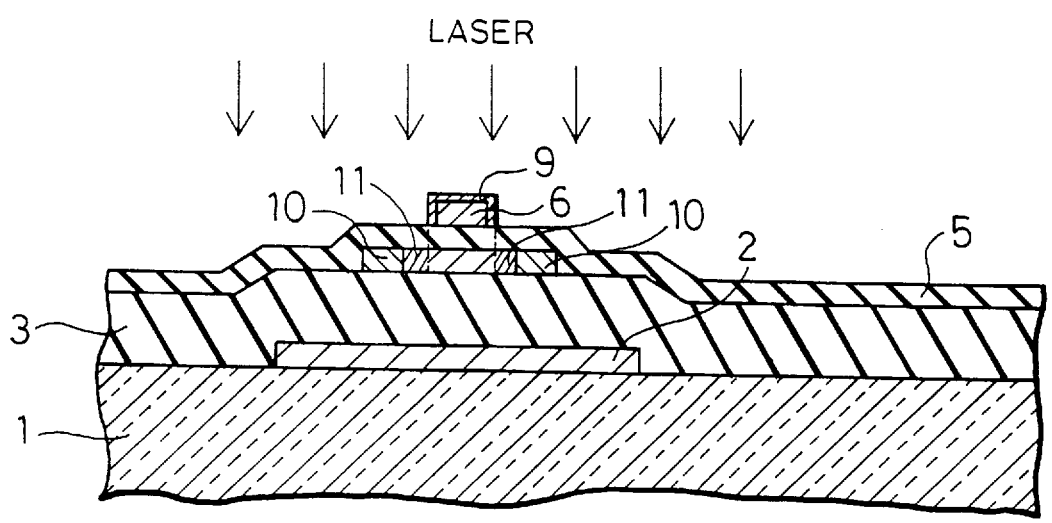
FIG. 16 is a cross sectional view which shows a next step of manufacturing a thin film transistor following the step of FIG. 15, namely, the step of removing the side anodic oxide films and forming an offset region in the semiconductor layer by projecting a laser beam.

As shown in FIG. 16, after the side anodic oxide films 8 are etched, a laser beam is projected thereto from the upper surface of the gate electrode 6. As a result, the impurity region 10 is activated so that the source/drain regions are formed, and an offset region 11 which is adjacent to the source/drain regions is formed. As the laser, Xe—Cl excimer laser was used, and energy density of the laser at room temperature and in the atmosphere was 350 $mJ/cm^2$.

Figure 17:
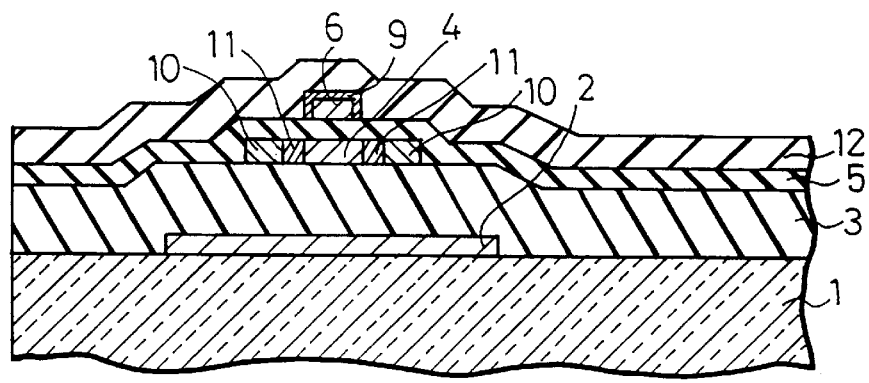
FIG. 17 is a cross sectional view which shows a next step of manufacturing a thin film transistor following the step of FIG. 16, namely, the step of forming a third insulating film on the anodic oxide film and the second insulating film.
Figure 18:
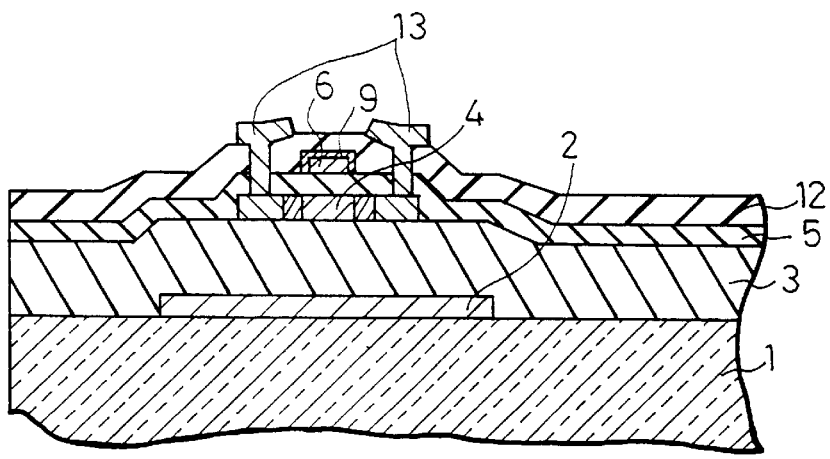
FIG. 18 is a cross sectional view which shows a next step of manufacturing a thin film transistor following the step of FIG. 17, namely, the step of forming source/drain electrodes.
Figure 19:
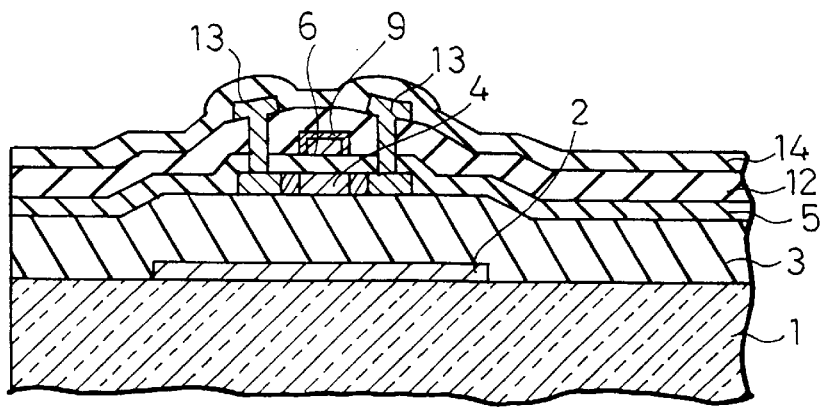
FIG. 19 is a cross sectional view which shows a next step of manufacturing a thin film transistor following the step of FIG. 18, namely, the step of forming a passivation film.
Figure 20:
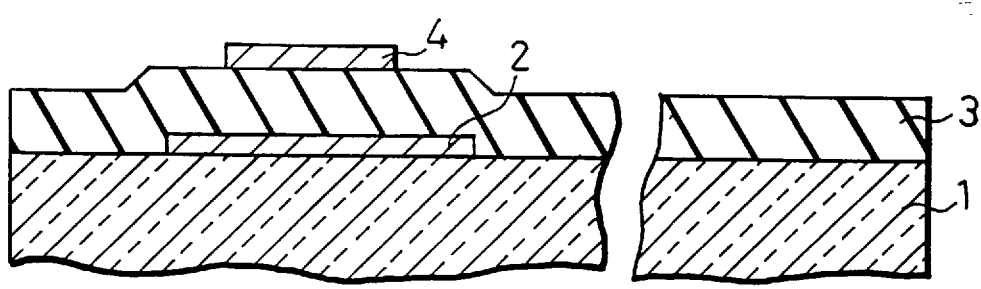
FIG. 20 is a cross sectional view which shows a next step of manufacturing a thin film transistor according to the conventional method, namely, the step of forming the light shielding film, the first insulating film and the semiconductor layer are formed on the light transmitting substrate in this order.
Figure 21:
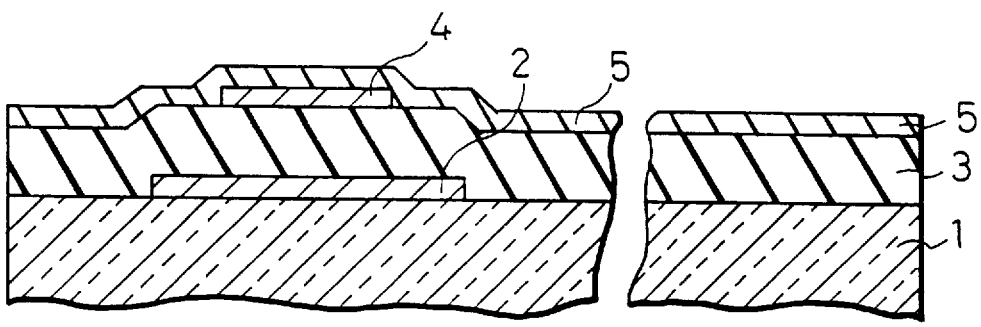
FIG. 21 is a cross sectional view which shows a next step of manufacturing a thin film transistor following the step of FIG. 20, namely, the step of forming a second insulating film on the semiconductor layer and the first insulating film.
Figure 22:
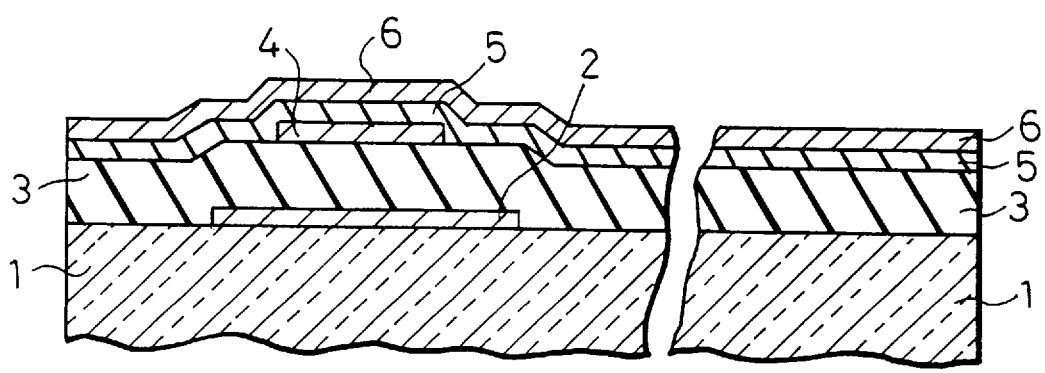
FIG. 22 is a cross sectional view which shows a next step of manufacturing a thin film transistor following the step of FIG. 21, namely, the step of laminating a gate metal to be a gate electrode on the second insulating film.
Figure 23:
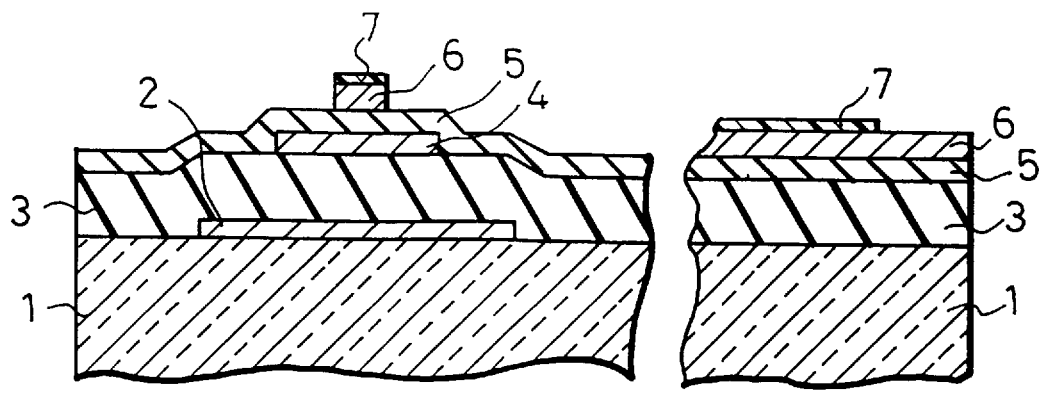
FIG. 23 is a cross sectional view which shows a next step of manufacturing a thin film transistor following the step of FIG. 22, namely, the step of patterning the gate electrode on the second insulating film and of forming the terminal for anodic oxidation by peeling off one portion of the resist on one end of the light transmitting substrate.
Figure 24:
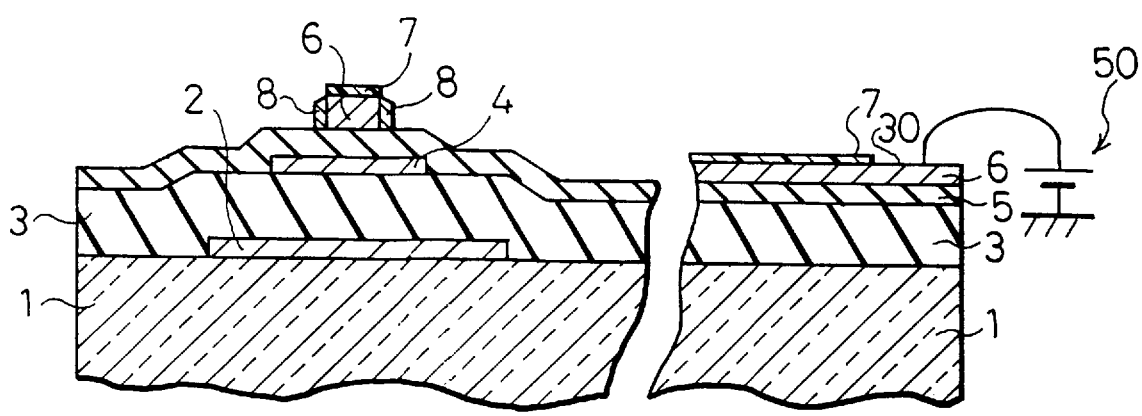
FIG. 24 is a cross sectional view which shows a next step of manufacturing a thin film transistor following the step of FIG. 23, namely, the step of forming the side anodic oxide films on the side of the gate electrode.
Figure 25:
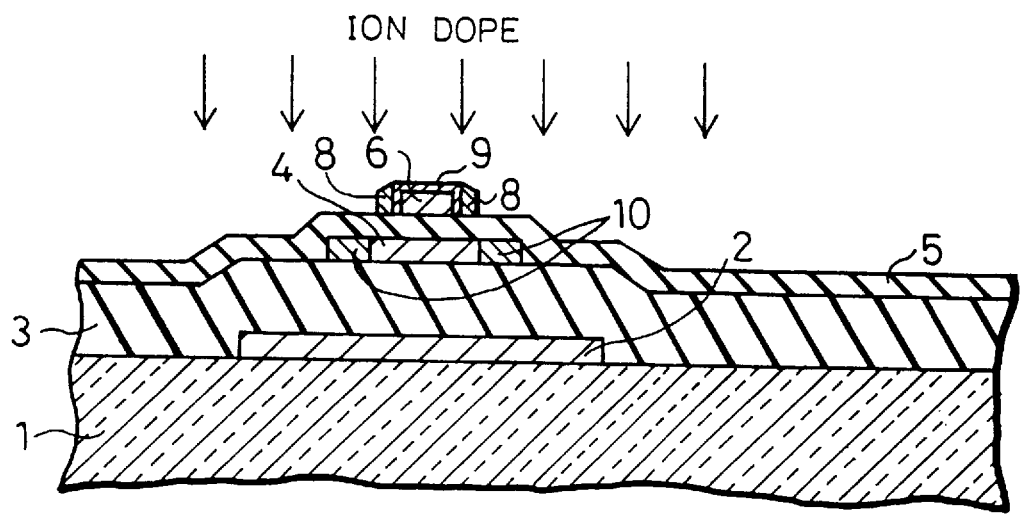
FIG. 25 is a cross sectional view which shows a next step of manufacturing a thin film transistor following the step of FIG. 24, namely, the step of forming the impurity layer on the semiconductor layer by ion doping.
Figure 26:
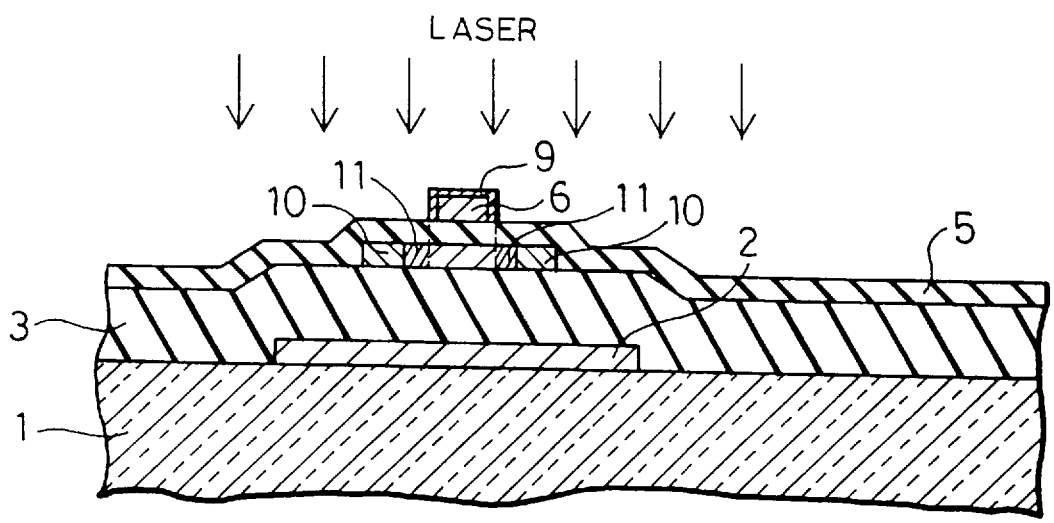
FIG. 26 is a cross sectional view which shows a next step of manufacturing a thin film transistor following the step of FIG. 25, namely, the step of removing the side anodic oxide films and of forming the offset region in the semiconductor layer by projecting a laser beam.
Figure 27:
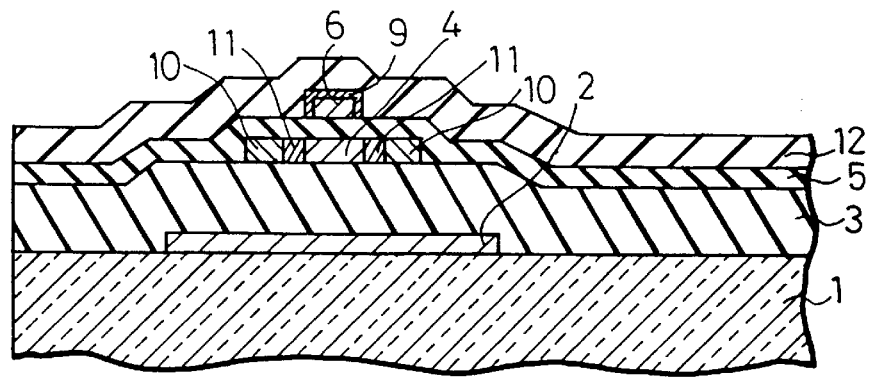
FIG. 27 is a cross sectional view which shows a next step of manufacturing a thin film transistor following the step of FIG. 26, namely, the step of forming the third insulating film on the anodic oxide film and the second insulating film.
Figure 28:
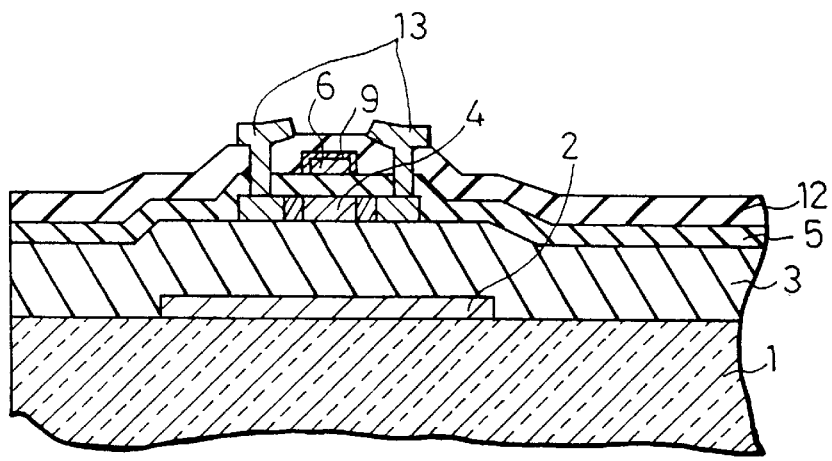
FIG. 28 is a cross sectional view which shows a next step of manufacturing a thin film transistor following the step of FIG. 27, namely, the step of forming the source/drain electrodes.
Figure 29:
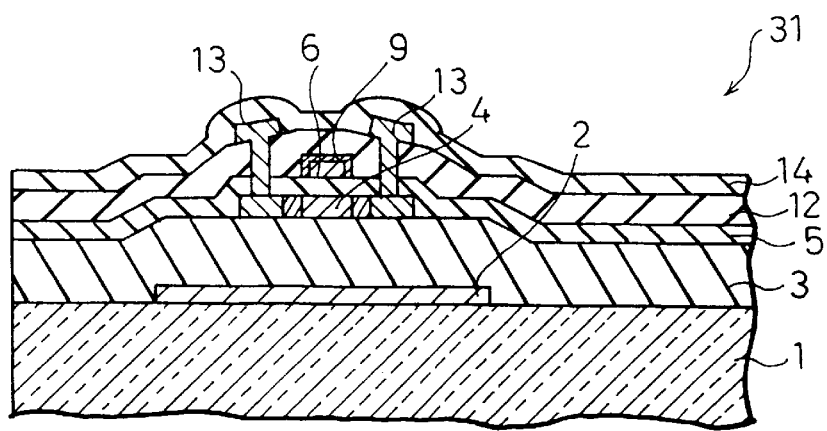
FIG. 29 is a cross sectional view which shows a next step of manufacturing a thin film transistor following the step of FIG. 28, namely, the step of forming the passivation film.

As shown in FIG. 17, a layer insulating film 12 as a third insulating film is deposited on the gate insulating film 5 and the anodic oxide film 9. Then, as shown in FIG. 18, the layer insulating film 12 and the gate insulating film 5 are etched, and a contact hole which is connected to the source/drain regions is formed. Next, a metal is deposited and patterned on the contact hole by sputtering, etc., and source/drain electrodes 13 which are electrically connected to the impurity region 10 as the source/drain region and wiring, not shown, which is electrically connected to the source/drain electrodes 13 are formed. Finally, as shown in FIG. 19, a passivation film 14 is deposited so that a thin film transistor 21 is completed.

In the present embodiment, the insulating film 3 is formed by the sputtering method and the gate insulating film is formed by the CVD method, but methods of forming the above insulating films are not limited to them, so various methods such as the sputtering method, the CVD method and the vacuum evaporation method can be used. Moreover, thicknesses and materials of the layers are not also necessarily limited.

In accordance with the above-mentioned invention, in the case where a metal as the light shielding film 2 is patterned on the light transmitting substrate 1 of the thin film transistor 21, the film-like terminal section 20 for anodic oxidation as well as the light shielding film 2 can be simultaneously formed by patterning the same kind of a metal as the light shielding film 2 on the end portion of the light transmitting substrate 1 as the terminal for anodic oxidation. Furthermore, with the above method, when a gate metal is formed on the gate insulating film 5 and the terminal section 20 for anodic oxidation so that the wiring space 19 is exposed, the gate electrode 6 can be electrically connected to the terminal section 20 for anodic oxidation easily. Moreover, with the above method, it is not necessary for connection to the gate electrode 6 to peel off one portion of the resist 7 and to apply an electrically conductive material. Further, since an insulating film, etc. is not deposited on the terminal section 20 for anodic oxidation, the process of etching an insulating film is not required. Therefore, with the above method, a number of the steps can be decreased, the process of anodic oxidation can be simplified and cost of production can be reduced. Moreover, a thin film transistor having high reliability can be provided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a thin film transistor, comprising:

the first step of forming a light shielding film and a terminal section for anodic oxidation on an insulating light transmitting substrate;

the second step of laminating a first insulating film, a semiconductor layer and a second insulating film on the light shielding film in this order;

the third step of forming a gate electrode on the second insulating film so that the gate electrode is electrically connected to the terminal section for anodic oxidation; and the fourth step of forming an anodic oxide film on the surface of the gate electrode.

2. The manufacturing method according to claim 1, wherein the light shielding film and the terminal section for anodic oxidation are made of the same metal.

3. The manufacturing method according to claim 1, wherein the light shielding film and the terminal section for anodic oxidation are formed at the same time.

4. The manufacturing method according to claim 1, wherein said first step includes:

the step of laminating a metal on the insulating light transmitting substrate; and the step of forming the light shielding film and the terminal section for anodic oxidation by patterning the metal.

5. The manufacturing method according to claim 1, wherein said second step is performed with the wiring space of the terminal section for anodic oxidation being masked.

6. The manufacturing method according to claim 1, wherein said third step is performed with the wiring space of the terminal section for anodic oxidation being masked.

7. The manufacturing method according to claim 1, wherein said third step includes:

the step of laminating an electrically conductive material to be the gate electrode on the second insulating film and the terminal section for anodic oxidation so that the wiring space for the terminal section for anodic oxidation is exposed; and the step of forming a gate electrode, which is electrically connected to the terminal section for anodic oxidation, on the second insulating film by patterning the electrically conductive material using a resist.

8. The manufacturing method according to claim 7, wherein the electrically conductive material is made of an alloy mainly containing an anodically oxidizable metal.

9. The manufacturing method according to claim 8, wherein the metal is Al.

10. The manufacturing method according to claim 7, wherein said fourth step includes:

the first anodically oxidizing step of forming a first anodic oxide film on the side of the gate electrode by anodically oxidizing the gate electrode on which the resist has been laminated;

the peeling step of peeling off the resist from the anodically oxidized gate electrode; and the second anodically oxidizing step of covering the outer circumference of the gate electrode with a second anodic oxide film by anodically oxidizing a non-anodically oxidized portion of the gate electrode.

11. The manufacturing method according to claim 1, further comprising the step of after forming a source region and a drain region on the semiconductor layer, forming a source electrode and a drain electrode which are electrically connected to the source region and the drain region.

* * * * *